US009008602B2

(12) United States Patent
Zuo et al.

(10) Patent No.: US 9,008,602 B2
(45) Date of Patent: Apr. 14, 2015

(54) RADIO FREQUENCY SWITCH FOR DIVERSITY RECEIVER

(75) Inventors: Chengjie Zuo, San Diego, CA (US);
Changhan Yun, San Diego, CA (US);
Chi Shun Lo, San Diego, CA (US);
Mario F. Velez, San Diego, CA (US);
Jonghae Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 13/464,092

(22) Filed: May 4, 2012

(65) Prior Publication Data

US 2013/0295866 A1    Nov. 7, 2013

(51) Int. Cl.
| H04B 1/06 | (2006.01) |
| H04B 1/44 | (2006.01) |
| H03C 7/02 | (2006.01) |
| H01Q 11/12 | (2006.01) |
| H04M 1/00 | (2006.01) |
| H04B 1/16 | (2006.01) |
| H04B 1/00 | (2006.01) |
| H04B 7/08 | (2006.01) |

(52) U.S. Cl.
CPC .................. *H04B 1/16* (2013.01); *H04B 1/005* (2013.01); *H04B 7/0825* (2013.01)

(58) Field of Classification Search
CPC ........ H04B 1/005; H04B 7/08; H04B 7/0825; H03K 17/00
USPC .......................................................... 455/269
See application file for complete search history.

(56) References Cited

U.S. PATENT DOCUMENTS

| 6,804,502 | B2 | 10/2004 | Burgener et al. |
| 6,965,788 | B1 * | 11/2005 | Barratt et al. ................. 455/574 |
| 7,505,790 | B2 | 3/2009 | Chang et al. |
| 7,772,648 | B1 | 8/2010 | Ivanov et al. |
| 8,457,685 | B1 * | 6/2013 | Bauder et al. .............. 455/553.1 |
| 2004/0038660 | A1 * | 2/2004 | He et al. ..................... 455/277.1 |

(Continued)

FOREIGN PATENT DOCUMENTS

| WO | 2011045442 A2 | 4/2011 |
| WO | 2011094284 A1 | 8/2011 |

OTHER PUBLICATIONS

International Search Report and Written Opinion—PCT/US2013/039681—ISA/EPO—Sep. 6, 2013.

(Continued)

*Primary Examiner* — Wesley Kim
*Assistant Examiner* — Devan Sandiford
(74) *Attorney, Agent, or Firm* — Donald D. Min

(57) ABSTRACT

A diversity receiver switch includes at least one second stage switch configured to communicate with a transceiver. The diversity receiver switch may also include at least one first stage switch coupled between a diversity receiver antenna and the second stage switch(es). The first stage switch(es) may be configured to handle a different amount of power than the second stage switch(es). The diversity receiver switch may include a bank of second stage switches configured to communicate with a transceiver. A first stage switch may be configured to handle more power than each switch in the bank of second stage switches. Alternatively, the diversity receiver switch include a bank of first stage switches coupled between the diversity receiver antenna and a second stage switch. The second stage switch may be configured to handle more power than each of the first stage switches.

21 Claims, 7 Drawing Sheets

(56) References Cited

U.S. PATENT DOCUMENTS

| | | | |
|---|---|---|---|
| 2004/0219959 A1* | 11/2004 | Khayrallah et al. | 455/575.7 |
| 2005/0079825 A1* | 4/2005 | Omori et al. | 455/67.11 |
| 2005/0143024 A1* | 6/2005 | Sung et al. | 455/101 |
| 2006/0194567 A1* | 8/2006 | Kelly et al. | 455/408 |
| 2010/0197263 A1* | 8/2010 | Dwyer et al. | 455/272 |
| 2010/0327948 A1 | 12/2010 | Nisbet et al. | |
| 2011/0237207 A1* | 9/2011 | Bauder | 455/78 |
| 2011/0267154 A1 | 11/2011 | Carroll et al. | |
| 2012/0057621 A1* | 3/2012 | Hong et al. | 375/219 |
| 2012/0321004 A1* | 12/2012 | Soul et al. | 375/259 |
| 2012/0322398 A1* | 12/2012 | Pullela et al. | 455/302 |
| 2013/0225094 A1* | 8/2013 | Mujtaba et al. | 455/73 |
| 2013/0273856 A1* | 10/2013 | Park | 455/73 |
| 2013/0273859 A1* | 10/2013 | King et al. | 455/78 |
| 2013/0285741 A1* | 10/2013 | Wright | 330/145 |

OTHER PUBLICATIONS

Sony, "CXM3531XR", SP4T Antenna Switch for CDMA/UMTS, 2012, 10pgs Sony, "CXM3531XR", SP4T Antenna Switch for CDMA/UMTS, retrieved online Sep. 18, 2012, 10pgs.

* cited by examiner

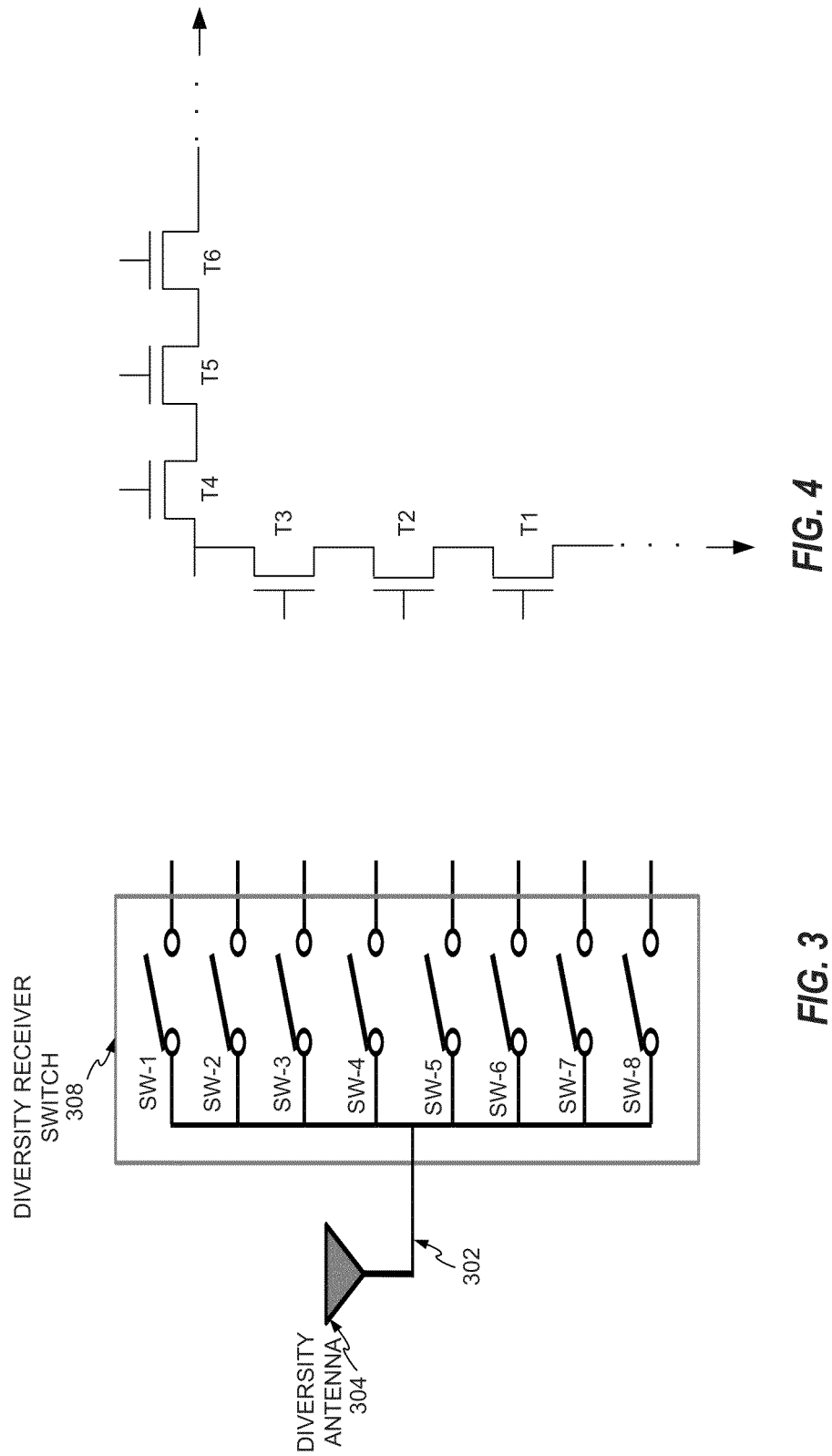

RADIO FREQUENCY SWITCH FOR DIVERSITY RECEIVER

TECHNICAL FIELD

The present description is related, generally, to integrated circuits, more specifically, to a radio frequency switch design for a diversity receiver.

BACKGROUND

A wireless handset/device includes a primary antenna for receiving and transmitting signals. A secondary antenna may also be provided for a diversity receiver. Generally, the primary antenna operates normally and is on all of the time.

Radio Frequency switches are used in many different ways in wireless devices. For example, RF switches can connect the primary antenna and/or a diversity antenna to a transmitter and a receiver. If a switch, for example, a primary transceiver switch, is specified to handle both transmit power levels and receive power levels, the design of the switch is more complex and generally larger. In particular, for higher power applications, e.g., greater than 30 dB, a triple gate or a stack of field-effect transistors are specified.

A diversity receiver switch is implemented in the diversity receive path of the wireless device, and the diversity receiver switch operates in conjunction with a primary transceiver switch. Conventionally, the diversity receiver switch, however, is not designed specifically for diversity receivers. Instead, the diversity receiver switch is designed to include a power handling capacity similar to the primary transceiver switch implemented in the primary transceiver path. Although, implementing a higher power handling diversity receiver switch in the diversity receiver path may be adequate, doing so may result in an inefficient use of power, increased complexity, and an unnecessary use of space in the wireless device.

SUMMARY

According to one aspect of the disclosure, a diversity receiver switch is described. The diversity receiver switch may include at least one second stage switch configured to communicate with a transceiver. The diversity receiver switch may also include at least one first stage switch coupled between a diversity receiver antenna and the at least one second stage switch. The least one first stage switch may be configured to handle a different amount of power than the at least one second stage switch.

According to one aspect of the disclosure, a diversity receiver switch includes means for switching communications with a transceiver. The diversity receiver switch may also include means for switching communications between a diversity receiver antenna and a transceiver switching means. The antenna switching means may be configured to handle a different amount of power than the transceiver switching means.

According to a further aspect of the disclosure, a method for communication within a diversity receiver switch is described. The method includes decoupling a diversity antenna signal from at least one second stage switch when the diversity receiver is in an off state. The method further includes coupling the diversity antenna signal to the at least one second stage switch when the diversity receiver is in an on state.

According to an additional aspect of the disclosure, a method for communication within a diversity receiver switch is described. The method includes the step of decoupling a diversity antenna signal from at least one second stage switch when the diversity receiver is in an off state. The method further includes the step of coupling the diversity antenna signal to the at least one second stage switch when the diversity receiver is in an on state.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present teachings, reference is now made to the following description taken in conjunction with the accompanying drawings.

FIG. 3 illustrates a conventional diversity receiver switch configured to accommodate an increased power handling specification.

FIG. 4 illustrates a transistor configuration for each switch of a diversity switch configuration.

DETAILED DESCRIPTION

Figure 1:
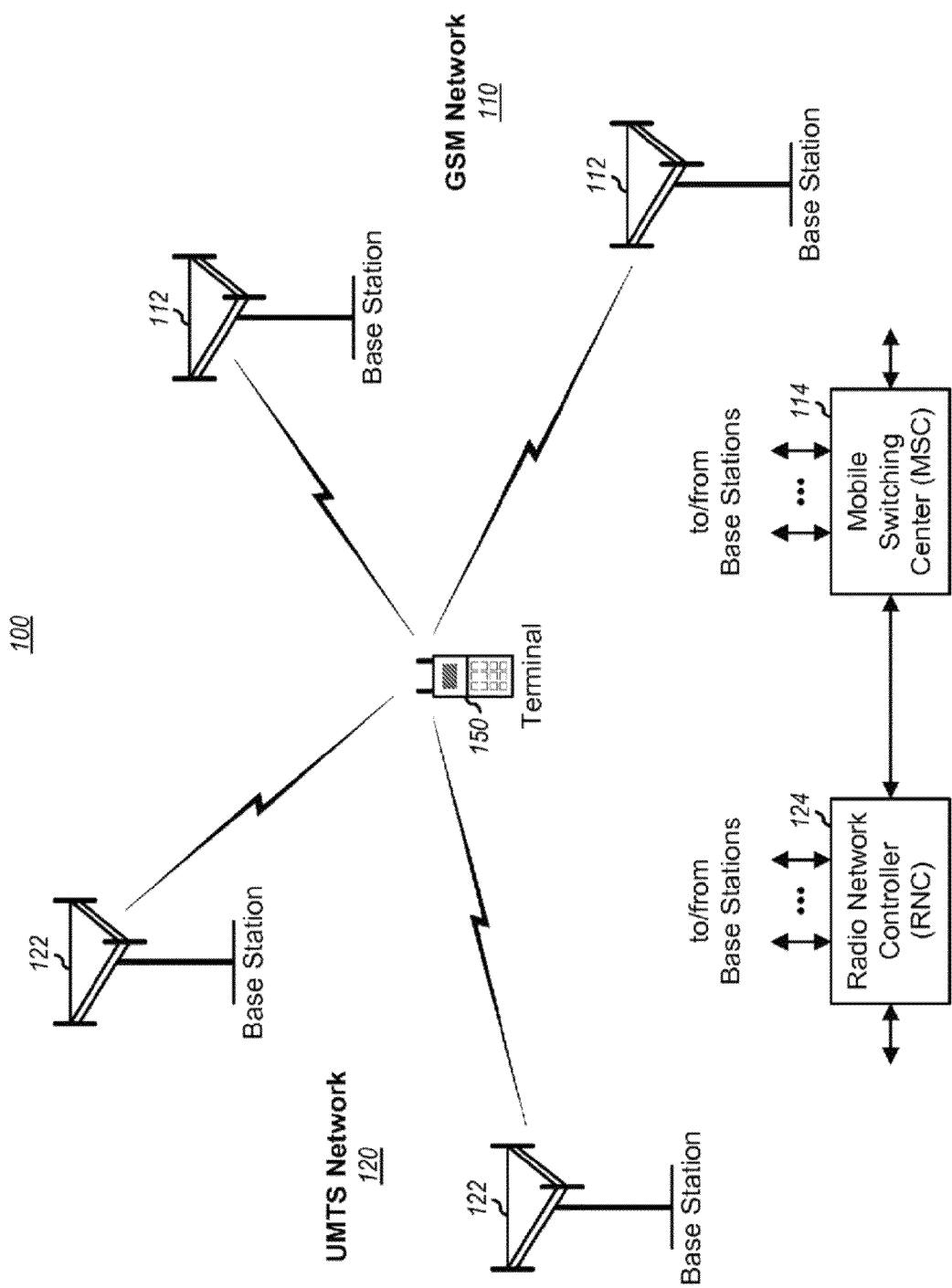
FIG. 1 illustrates a network that includes a Global System For Mobile Communications (GSM) network and a Universal Mobile Communications System (UMTS) network.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The diversity receiver switch described herein may be used for communication, computing, networking, and other applications. For example, the diversity receiver switch may be implemented in a cellular phone, a personal digital assistant (PDA), a wireless modem card, an access point, or some other device for wireless communication. The wireless device may also be called a mobile station, a user equipment, a terminal, a subscriber unit, a station, or some other terminology.

In some aspects, the diversity receiver switch described herein may be used for various wireless communication systems such as a code division multiple access (CDMA) system, a time division multiple access (TDMA) system, a frequency division multiple access (FDMA) system, an orthogonal frequency division multiple access (OFDMA) system, an orthogonal frequency division multiplexing (OFDM) system, a single-carrier frequency division multiple access (SC-FDMA) system, and other systems that transmit modulated data. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). For clarity, much of the description below is for an integrated circuit device (e.g., a diversity receiver switch for a cellular phone) in GSM and UMTS system. The integrated circuit device may be part of a device (e.g., cellular phone) configured to receive and process GPS signals from GPS satellites.

In general, the diversity receiver switch may support any number of radio technologies and any of the radio technologies known in the art. For clarity, the diversity receiver switch is specifically described below for GSM and UMTS.

In emerging wireless device applications, a secondary or diversity receiver antenna may be used in conjunction with a primary antenna. Some aspects of the disclosure implement a diversity receiver switch that includes a reduced number of transistors for accommodating reduced power handling specifications. The reduced number of transistors enables a smaller chip area and board area for the diversity receiver switch.

Some aspects of the disclosure include a diversity receiver switch design for a diversity receiver path that reduces the size of the switch implementation. The switch can be implemented in different technologies including but not limited to gallium arsenide (GaAs), silicon on insulator (SOI), silicon on sapphire (SOS), silicon on glass (SOG), bulk complimentary metal oxide semiconductor (CMOS) and other III-V semiconductor technology such as gallium nitride (GaN) and indium gallium phosphide (InGaP) and other like semiconductor technologies.

FIG. 1 illustrates a network 100 that includes a GSM network 110 and a UMTS network 120. The terms "network" and "system" are often used interchangeably. The UMTS network 120 implements WCDMA and is also referred to as a UMTS Terrestrial Radio Access Network (UTRAN). The term "UMTS" and "WCDMA" are used interchangeably in the description below. The GSM network 110 and UMTS network 120 are two wireless networks that employ different radio technologies but belong to the same service provider or network operator.

The GSM network 110 includes base stations 112 that communicate with terminals within the coverage area of the GSM network 110. A base station is a fixed station that communicates with the terminals and may be called, a base transceiver station (BTS), an access point, and so on. A mobile switching center (MSC) 114 couples to the base stations 112 and coordinates and controls these base stations. The UMTS network 120 includes base stations 122 that communicate with terminals within the coverage area of the UMTS network 120. A radio network controller (RNC) 124 couples to the base stations 122 and coordinates and controls these base stations 122. The RNC 124 communicates with the MSC 114 to support inter-working between the GSM and UMTS networks 110, 120.

A terminal/user equipment 150 is capable of communicating with the GSM network 110 and UMTS network 120. This capability allows a user to obtain the performance advantages of UMTS and the coverage benefits of GSM with the same terminal. The terminal 150 may be fixed or mobile and may be called an access terminal (AT), a mobile station (MS), a mobile equipment (ME), and so on. The terminal 150 may be a cellular phone, a personal digital assistant (PDA), a wireless modem, a wireless communication device, a handheld device, a subscriber unit, and so on. The terminal/UE 150 may be designed to operate on one or more frequency bands.

Figure 2:
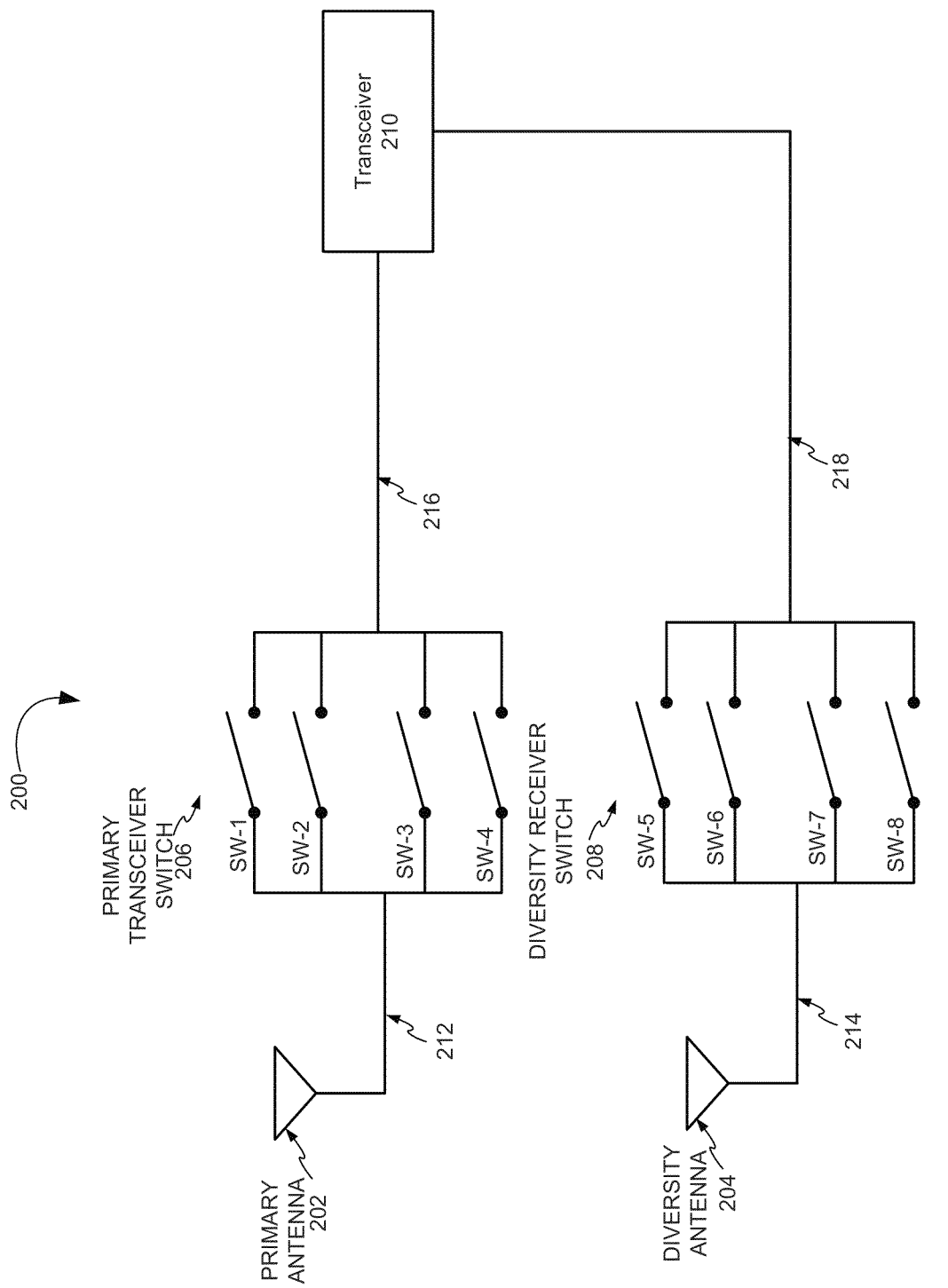
FIG. 2 illustrates a wireless handset including a primary transceiver path and a diversity receiver path.

FIG. 2 illustrates a wireless device 200 including a primary transceiver switch 206 of a primary transceiver and a diversity receiver switch 208 of a diversity receiver. A primary receiver/transmitter (or transceiver) path includes a primary antenna 202, the primary transceiver switch 206, and a transceiver 210. The primary antenna 202 may be coupled to the primary transceiver switch 206 via an interconnect 212. The transceiver 210 may be coupled to the primary transceiver switch 206 via an interconnect 216. A diversity receiver path includes a diversity antenna 204, the diversity receiver switch 208, and the transceiver 210. The diversity antenna 204 may be coupled to the diversity receiver switch 208 via an interconnect 214. The transceiver 210 may be coupled to the diversity receiver switch 208 via an interconnect 218. In another configuration, the primary transceiver and the diversity receiver are integrated on a same chip with the transceiver 210.

The diversity receiver path may be configured for receiving signals while the primary transceiver path is configured for both receiving and transmitting signals. Accordingly, the primary transceiver path is specified to accommodate higher power handling capabilities associated with both transmitting and receiving signals, while the diversity receiver path handles lower power. A transmitted signal power from the primary transceiver is generally greater than a received signal power.

In this configuration, the wireless device 200 supports operation on four frequency bands represented by each of the switches SW-1 to SW-4 of the primary transceiver switch 206 and each of the switches SW-5 to SW-8 of the diversity receiver switch 208. The four frequency bands supported by the diversity receiver path may be different from the four frequency bands supported by the primary transceiver path. Accordingly, the wireless device 200 of this configuration may support eight frequency bands. Selection of each of the supported frequency bands is based on the selection or activation (e.g., turning on) of a switch of the primary transceiver switch 206 or the diversity receiver switch 208. Each of the switches SW-1 to SW-4, and SW-5 to SW-8 is configured to communicate with the transceiver 210. Therefore, when the band associated with switch SW-1 is selected, communication to the transceiver is implemented via the switch SW-1. Although FIG. 2 illustrates that the primary transceiver switch 206 and the diversity receiver switch 208 include four switches, the primary transceiver switch 206 and the diversity receiver switch 208 may have more or fewer than four switches electrically coupled in parallel.

Conventionally, the diversity receiver switch 208 in the diversity receiver path is configured to have the same higher power handling capability of the primary transceiver switch 206. Although, implementing the higher power handling diversity receiver switch 208 in the diversity receiver path may be adequate, doing so may result in an inefficient use of power, increased complexity, and an unnecessary use of space in the wireless device 200. That is, a diversity receiver has a lower power specification because it is off in certain conditions, during which the power handling specification differs from when the receiver is on. Therefore, an efficient and improved diversity receiver switch is described.

FIG. 3 illustrates a conventional diversity receiver switch 308 configured to accommodate an increased power handling specifications of a primary transceiver switch. In one aspect of the disclosure, the increased power handling specification of the diversity receiver switch 308 is substantially equivalent to the power handling specification of the primary transceiver switch 206 (FIG. 2). Although FIG. 3 illustrates that the interconnect 302 directly couples the diversity receiver switch 308 to the diversity antenna 304, the diversity antenna 304 may be indirectly coupled to the diversity receiver switch 308.

The conventional diversity receiver switch 308 may include a bank of switches SW-1 to SW-8, each configured according to a single pole multi-throw (e.g., eight) configuration. An output of each switch of the bank of switches SW-1 to SW-8 may be coupled to the transceiver (not shown) to allow band selected communication to the transceiver. In this configuration, the diversity receiver switch 308 supports operation on eight frequency bands. Selection of each of the supported frequency bands is based on the selection of a switch of the bank of switches SW-1 to SW-8. Each switch of the bank of switches SW-1 to SW-8 may be configured to accommodate the power handling specifications of a primary transceiver switch.

In general, the power handling specifications for the primary transceiver switch is, for example, 32 dB, 35 dB, or a similar power level. As noted earlier, implementing this higher power handling specification on the diversity receiver switch 308, while adequate, may result in an inefficient use of power, increased complexity, and an unnecessary use of space.

For the diversity receiver switch 308 to accommodate the increased or higher power level specification, the number of transistors associated with each switch SW-1 to SW-8 may be increased (e.g., to 7 transistors), and stacked in a cascaded configuration as illustrated in FIG. 4. In particular, FIG. 4 illustrates an exemplary transistor configuration for each switch SW-1 to SW-8 of the diversity receiver switch 308, as shown in FIG. 3. The transistor configuration includes transistors T1 to T6 stacked in a combination with a parallel configuration (e.g., transistors T1 to T3) and a series configuration (e.g., transistors T4 to T6). In one configuration, the number of transistors in the parallel configuration is equal to the number of transistors in the series configuration.

Transistor stacking can improve the power handling capability of low voltage devices because stacking creates a virtual high-voltage CMOS field effect transistor, for example, that can increase the power handling capacity of a device (e.g., a switch). As shown in FIG. 4, the voltage across the transistors may be evenly divided among the transistors T1-T3 or T4-T6. The power handling capacity of each switch, SW-1 to SW-8, is proportional to the stack of transistors T1 to T3 or T4 to T6, and, consequently, the size of the diversity receiver switch 308. The increased number of transistors for achieving the increased power handling specification of the diversity receiver switch 308 also increases the size of the diversity receiver switch 308.

Figure 5A:
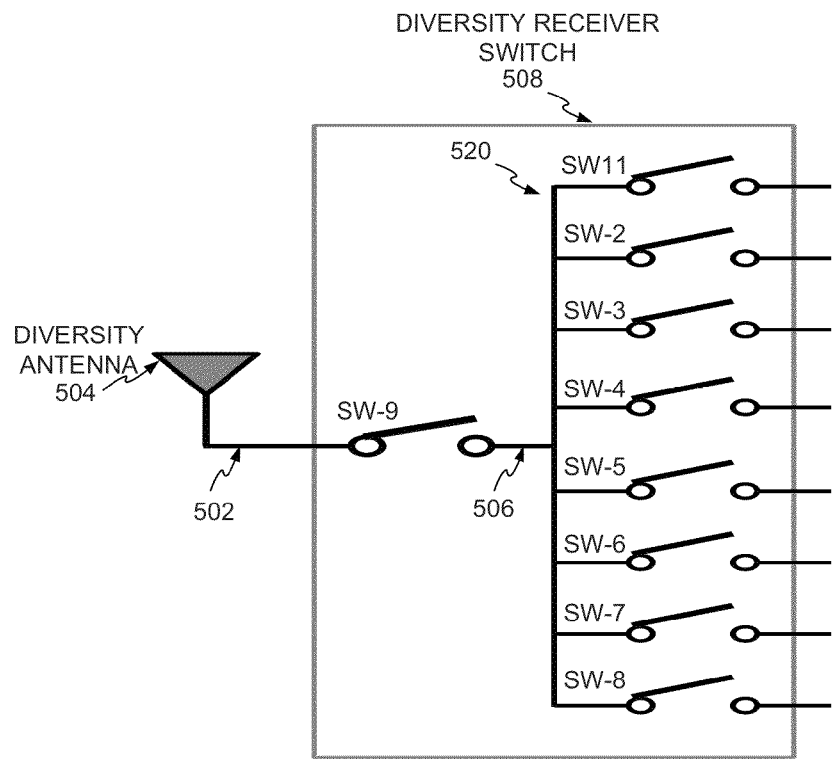
FIGS. 5A and 5B illustrate a diversity receiver switch configured to accommodate a lower power handling specification according to some aspects of the disclosure.
Figure 5B:
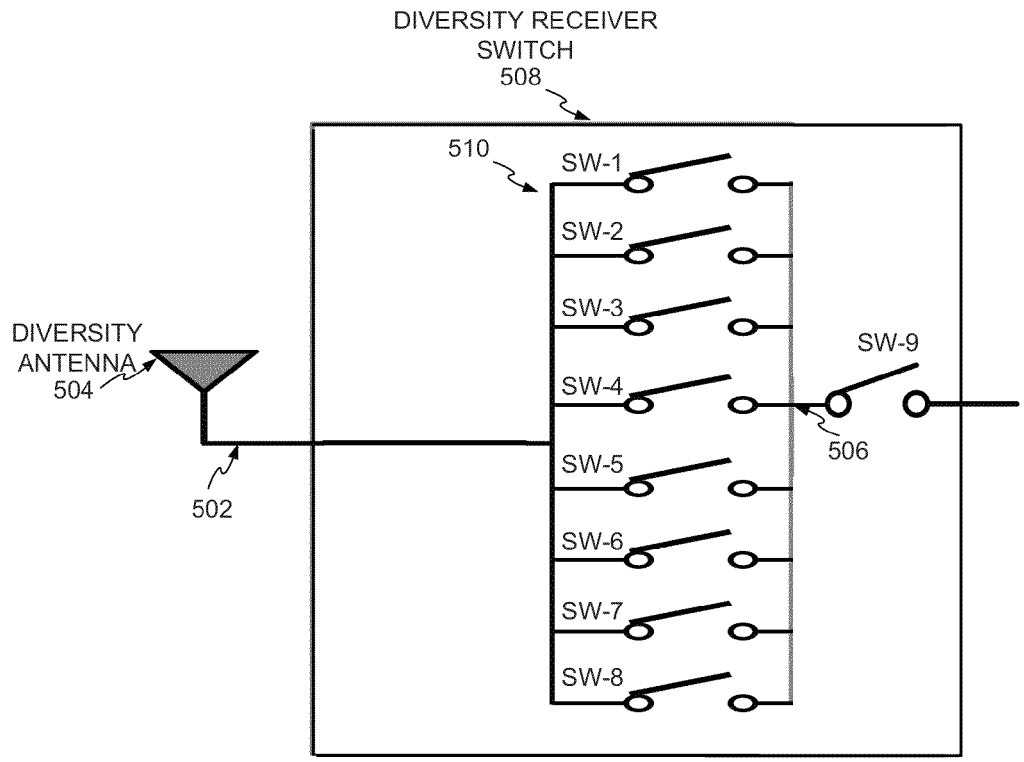

FIGS. 5A and 5B illustrate a diversity receiver switch 508 configured to accommodate a lower power handling specification according to some aspects of the disclosure. The diversity receiver switch 508 is configured according to a lower power handling specification because of the different power handling specifications associated with on and off conditions of the diversity receiver switch 508. In particular, the diversity receiver switch 508 can be implemented in a diversity receiver path that also includes a diversity antenna 504 and a transceiver (not shown). The diversity receiver switch 508 includes a first stage including a switch SW-9 (FIG. 5A) or a bank of first stage switches 510 (FIG. 5B) and a second stage including the bank of second stage switches 520 (FIG. 5A) or the switch SW-9 (FIG. 5B).

As shown in FIGS. 5A and 5B, the first stage and the second stage can be interchanged (as in FIG. 5B relative to FIG. 5A) depending on the desired applications. The two-stage configuration may operate according to the on and the off conditions of the diversity receiver switch 508. For example, FIG. 5A illustrates that when the diversity receiver switch is off, the first stage, which includes one switch SW-9 is specified to handle a higher power. Conversely, conventional one stage configurations specify that all of the switches handle the higher power associated with the off condition. Each switch SW-1 to SW-8 of the bank of second stage switches 520 of FIG. 5A is configured to communicate with the transceiver (not shown) based on the selected band associated with each switch SW-1 to SW-8. The switch SW-9 of FIG. 5B is configured to communicate with the transceiver (not shown).

The diversity antenna 504 may be coupled to the first stage, which includes the switch SW-9 (FIG. 5A) or the bank of first stage switches 510 via an interconnect 502 (FIG. 5B). Although FIGS. 5A and 5B illustrate that the interconnect 502 directly couples the switch SW-9 or the bank of first stage switches 510 to the diversity antenna 504, the diversity antenna 504 may be indirectly coupled to the first stage switch SW-9 or the bank of first stage switches 510. The switch SW-9 may be coupled to the bank of second stage switches 520 via an interconnect 506, as shown in FIG. 5A. Although FIGS. 5A and 5B illustrate that the interconnect 506 directly couples the switch SW-9 to the bank of first/second stage switches 510/520, the bank of first/second stage switches 510/520 may be indirectly coupled to the switch SW-9.

In some aspects of the disclosure, the switch SW-9 is implemented as a single pole single throw switch configuration. In some aspects of the disclosure, each switch SW-1 to SW-8 of the bank of second stage switches 520 is implemented as a single pole single throw switch configuration. In some aspects of the disclosure, the bank of first/second stage switches 510/520 may be implemented as a single pole multi-throw configuration.

The diversity receiver switch 508 can be implemented to support the GSM mode when the diversity receiver switch 508 is in an off state. In this state, the power leaked from a primary antenna to the diversity antenna 504 is greater than the power handling capacity associated with the on state (e.g., in a WCDMA mode) of the diversity receiver switch 508. In the off state, the power handling capability of the diversity receiver switch 508 is based on the power leaked from the primary antenna to the diversity antenna 504.

In general, the power handling capability of the diversity receiver switch 508, in the off state, is 26 dB, or a similar power level. In some aspects of the disclosure, the first stage switch SW-9 of the diversity receiver switch 508 is configured to accommodate the off state power level of the diversity receiver switch 508. For example, in operation the first stage switch SW-9 is set to an off position to absorb or accommodate the 26 dB power leaked from the primary antenna to the diversity receiver switch 508.

The diversity receiver switch 508 also supports a WCDMA mode when the diversity receiver switch 508 is in an on state. In this state, the power specified for the diversity receiver switch 508 is less than when the diversity receiver switch 508 is in the off state. For example, during transmission on the primary transceiver path, the standard transmit power is set to about 23 dB and for some WCDMA implementations, 24 dB or a similar power level. Because there are no transmitters in the diversity receiver path, the primary antenna is isolated from the diversity antenna 504.

In some aspects of the disclosure, a 10 dB (or similar power difference) isolation naturally exists (due to physical distance) between the primary antenna and the diversity antenna 504. As a result, the power handling capability at the diversity receiver switch 508 is specified by subtracting the 10 dB difference from the 23 dB or 24 dB standard transmit power, which results in a 13 dB or 14 dB power specification at the diversity receiver switch 508. In some aspects of the disclosure, an additional 3 dB of power is accounted for at the diversity receiver switch 508 to accommodate an impedance mismatch at the diversity receiver switch 508. As a result, the power handling specification of the diversity receiver switch 508 in the on state is about 17 dB, or a similar power level.

Because the power handling capability of the diversity receiver switch 508, both in the on state and the off state, is much less than the power handling capability of a conventional diversity switch or a primary transceiver switch, the number of transistors specified for the current diversity receiver switch 508 is reduced. By reducing the number of transistors, the overall size of the diversity receiver switch 508 is also reduced. In general, every 3 dB reduction of the power handling specification can result in a reduction of the switch size by half. As a result, one configuration of the proposed two-stage design for a diversity receiver switch provides a significant size and cost reduction.

The current diversity receiver switch 508 accommodates the on and off state by a two-stage design, instead of burdening every port of each switch with the off-state power handling. In some aspects of the disclosure, the two-stage switch design can be applied in any of the gallium arsenide (GaAs), Silicon on Insulator (SOI), Silicon on Sapphire (SOS), Silicon on Glass (SOG) and other CMOS technologies, for any application where a high power handling capability is specified in an off state, while a low power handling is specified in the on state. As noted above, the order of the first stage (or high power handling specification stage) and the second stage may be interchanged based on different applications.

Figure 6:
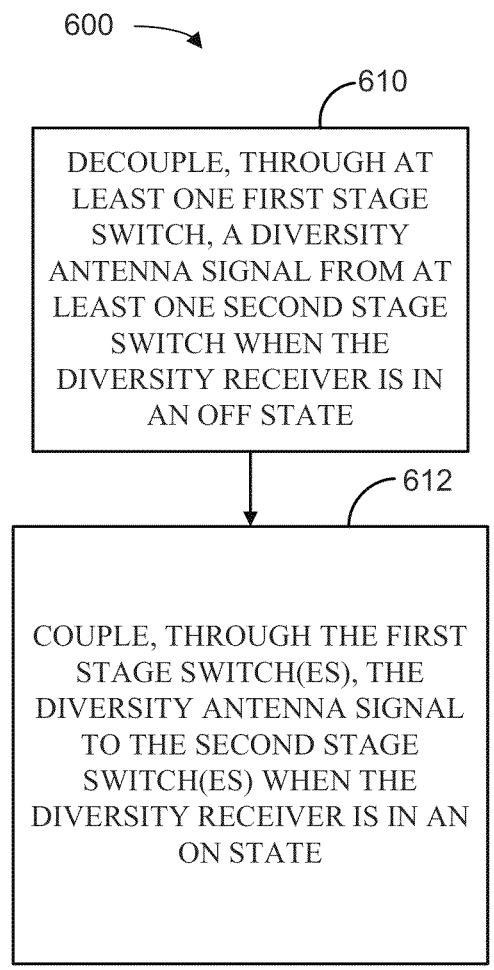
FIG. 6 is a flowchart illustrating a method for communication within a diversity receiver switch according to a further aspect of the disclosure.

FIG. 6 is a flow diagram illustrating a method 600 for communication within a diversity receiver switch according to one aspect of the present disclosure. As shown in FIG. 6, a diversity antenna signal is decoupled, through at least one first stage switch, from at least one second stage switch when the diversity receiver is in an off state, as shown at block 610. For example, FIG. 5A illustrates that when the diversity receiver switch is off, the first stage, which includes one switch SW-9 specified to handle a higher power. As shown in FIG. 5B, when the diversity receiver switch is off, the second stage, which includes the switch SW-9 is specified to handle a higher power than the first stage switches 510, which includes switches SW-1 to SW-8.

As further shown in FIG. 6, the diversity antenna signal is coupled, through the first stage switch(es), to the second stage switch(es) when the diversity receiver is in an on state, as shown in block 612. For example, FIG. 5A illustrate that the interconnect 506 couples the switch SW-9 to the bank of second stage switches 520 during an on state. In this configuration, the first stage switch(es) is configured to handle a different amount of power than the second stage switch(es). As shown in FIG. 5B, the switch SW-9 is coupled to the bank of the first stage switches 510 via the interconnect 506 during the on state and is specified to handle a higher power than the first stage switches 510.

In one configuration, the diversity receiver switch includes means for switching communications with a transceiver. In one aspect of the disclosure, the means for switching communications may be the bank of second stage switches 520, the diversity receiver switch 308 and/or diversity receiver switch 208 configured to perform the functions recited by the means for switching communications, for example, as shown in FIGS. 2, 3, and 5A. In a further aspect of the disclosure, the means for switching communications may be the switch SW-9 configured to perform the functions recited by the means for switching communications, for example, as shown in FIG. 5B.

In one configuration, the diversity receiver switch includes a means for switching communications between a diversity receiver antenna and a transceiver switching means. In one aspect of the disclosure, the antenna switching means may be the switch SW-9 configured to perform the functions recited by the antenna switching means, as shown in FIG. 5A. In a further configuration, the antenna switching means may also include a bank of first stage switches 510 configured to perform the functions recited by the antenna switching means, for example, as shown in FIG. 5B.

Figure 7:
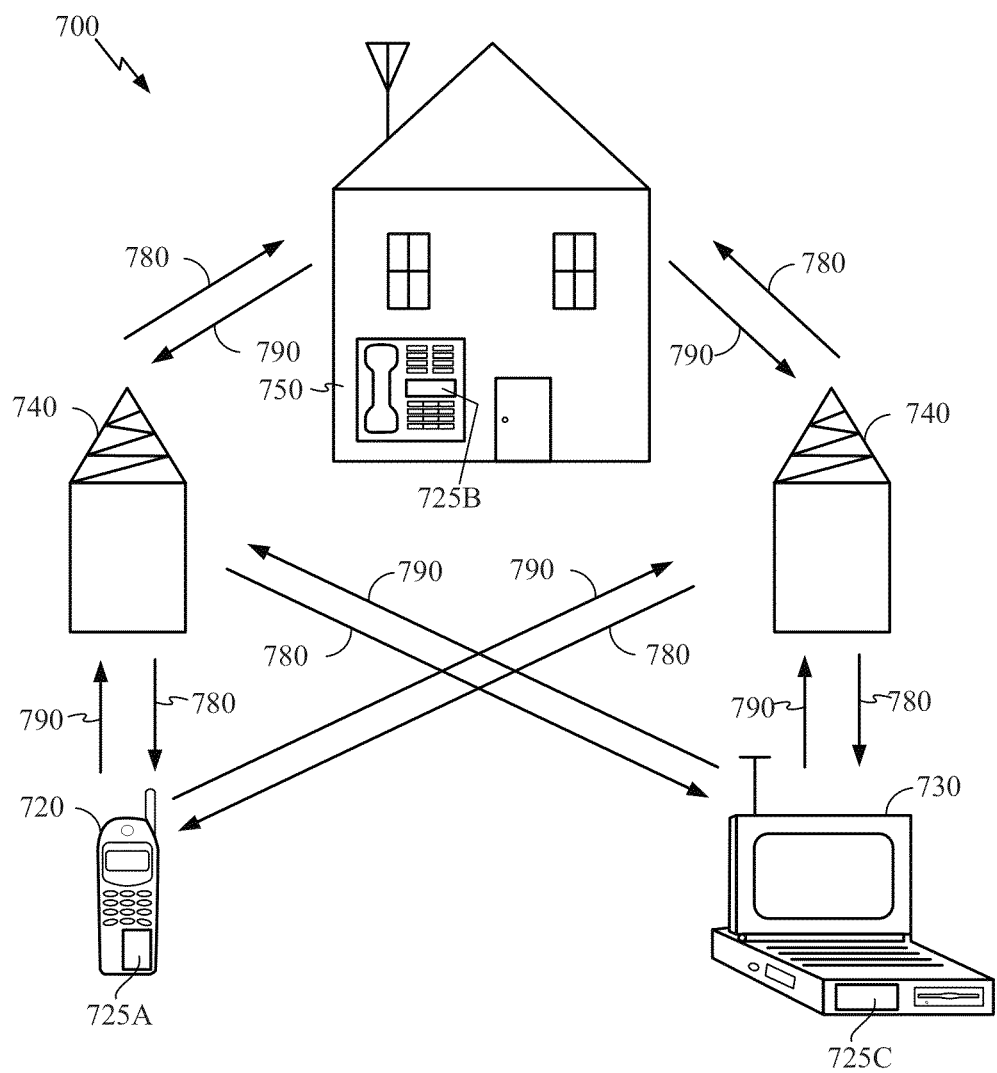
FIG. 7 is a block diagram showing a wireless communication system in which an aspect of the disclosure may be advantageously employed.

FIG. 7 is a block diagram showing an exemplary wireless communication system 700 in which an aspect of the disclosure may be advantageously employed. For purposes of illustration, FIG. 7 shows three remote units 720, 730, and 750 and two base stations 740. It will be recognized that wireless communication systems may have many more remote units and base stations/eNodeBs. Remote units 720, 730, and 750 include IC devices 725A, 725C and 725B, which include the disclosed diversity receiver switch. FIG. 7 shows forward link signals 780 from the base station 740 to the remote units 720, 730, and 750 and reverse link signals 790 from the remote units 720, 730, and 750 to base stations 740.

In FIG. 7, remote unit 720 is shown as a mobile telephone, remote unit 730 is shown as a portable computer, and remote unit 750 is shown as a fixed location remote unit in a wireless local loop system. For example, the remote units may be mobile phones, hand-held personal communication systems (PCS) units, portable data units such as personal data assistants, GPS enabled devices, navigation devices, set top boxes, music players, video players, entertainment units, fixed location data units such as meter reading equipment, or any other device that stores or retrieves data or computer instructions, or any combination thereof. Although FIG. 7 illustrates remote units according to the teachings of the disclosure, the disclosure is not limited to these exemplary illustrated units. Aspects of the disclosure may be suitably employed in any device, which includes the diversity receiver switch.

Figure 8:
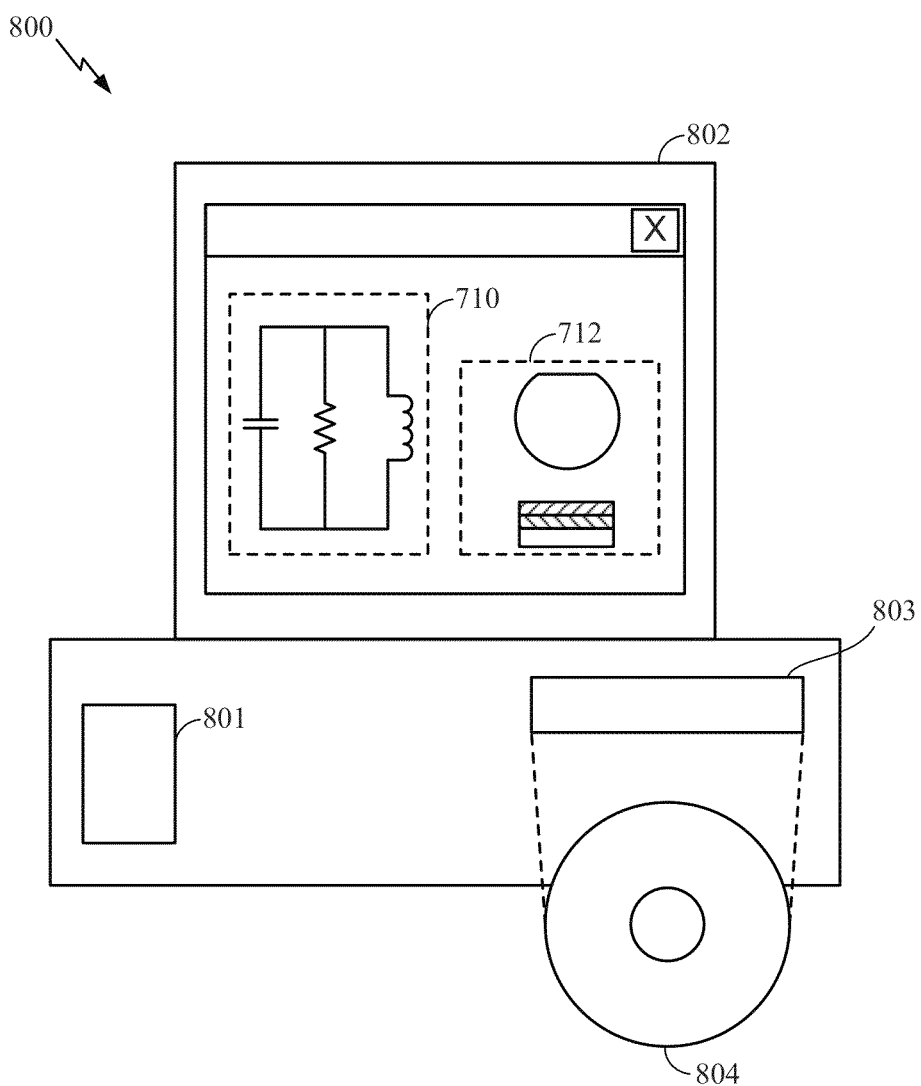
FIG. 8 is a block diagram illustrating a design workstation used for the circuit, layout, and logic design of a semiconductor component, such as the diversity receiver switch disclosed above.

FIG. 8 is a block diagram illustrating a design workstation used for circuit, layout, and logic design of a semiconductor component, such as the diversity receiver switch disclosed above. A design workstation 800 includes a hard disk 801 containing operating system software, support files, and design software such as Cadence or OrCAD. The design workstation 800 also includes a display 802 to facilitate design of a circuit 810 or a semiconductor component 812 such as a diversity receiver switch. A storage medium 804 is provided for tangibly storing the circuit design 810 or the semiconductor component 812. The circuit design 810 or the semiconductor component 812 may be stored on the storage medium 804 in a file format such as GDSII or GERBER. The storage medium 804 may be a CD-ROM, DVD, hard disk, flash memory, or other appropriate device. Furthermore, the design workstation 800 includes a drive apparatus 803 for accepting input from or writing output to the storage medium 804.

Data recorded on the storage medium 804 may specify logic circuit configurations, pattern data for photolithography masks, or mask pattern data for serial write tools such as electron beam lithography. The data may further include logic verification data such as timing diagrams or net circuits associated with logic simulations. Providing data on the storage medium 804 facilitates the design of the circuit design 810 or the semiconductor component 812 by decreasing the number of processes for designing semiconductor wafers.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine or computer readable medium tangibly embodying instructions may be used in implementing the methodologies described herein. For example, software code may be stored in a memory and executed by a processor. When executed by the processor, the executing software code generates the operational environment that implements the various methodologies and functionalities of the different aspects of the teachings presented herein. Memory may be implemented within the processor or external to the processor. As used herein, the term "memory" refers to any type of long term, short term, volatile, nonvolatile, or other memory and is not to be limited to any particular type of memory or number of memories, or type of media upon which memory is stored.

The machine or computer readable medium that stores the software code defining the methodologies and functions described herein includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. As used herein, disk and/or disc includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present teachings and their advantages have been described in detail, it should be understood that various changes, substitutions and alterations can be made herein without departing from the technology of the teachings as defined by the appended claims. Moreover, the scope of the present application is not intended to be limited to the particular aspects of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding aspects described herein may be utilized according to the present teachings. Accordingly, the appended claims are intended to include within their scope such processes, machines, manufacture, compositions of matter, means, methods, or steps.

What is claimed is:

1. A multi-stage diversity receiver switch, comprising:
   at least one second stage switch configured to communicate with a transceiver; and
   at least one first stage switch coupled between a diversity receiver antenna and the at least one second stage switch, the at least one first stage switch being configured to handle a different amount of power than the at least one second stage switch, the difference in power handling capability based at least in part on an amount of power leaked from a primary antenna to the diversity receiver antenna.

2. The diversity receiver switch of claim 1, in which the at least one second stage switch comprises a bank of second stage switches; and
   the at least one first stage switch comprises a single first stage switch configured to handle more power than the bank of second stage switches.

3. The diversity receiver switch of claim 2, in which each second stage switch comprises transistors fabricated on a substrate selected from a group consisting of Silicon on Insulator (SOI), Silicon on Sapphire (SOS), or Silicon on Glass (SOG).

4. The diversity receiver switch of claim 2, in which the at least one first stage switch comprises a single pole single throw switch configuration.

5. The diversity receiver switch of claim 2, in which each second stage switch comprises a single pole single throw switch configuration.

6. The diversity receiver switch of claim 2, in which the bank of second stage switches are configured according to a single pole multi-throw switch configuration.

7. The diversity receiver switch of claim 2, in which the at least one first stage switch is configured to accommodate an off state power specification of the diversity receiver switch.

8. The diversity receiver switch of claim 2, in which each switch of the bank of second stage switches is configured to accommodate an on state power specification of the diversity receiver switch.

9. The diversity receiver switch of claim 2, further comprising a plurality of first stage switches coupled between the diversity receiver antenna and the bank of second stage switches.

10. The diversity receiver switch of claim 1, in which the at least one first stage switch comprises a bank of first stage switches; and the at least one second stage switch comprises a single second switch configured to handle more power than the bank of first stage switches.

11. The diversity receiver switch of claim 10, in which each first stage switch comprises transistors fabricated on a substrate selected from a group consisting of Silicon on Insulator (SOI), Silicon on Sapphire (SOS), or Silicon on Glass (SOG).

12. The diversity receiver switch of claim 10, in which the at least one second stage switch comprises a single pole single throw switch configuration.

13. The diversity receiver switch of claim 10, in which each first stage switch comprises a single pole single throw switch configuration.

14. The diversity receiver switch of claim 10, in which the bank of first stage switches is configured according to a single pole multi-throw switch configuration.

15. The diversity receiver switch of claim 1, integrated into a mobile phone, a set top box, music player, video player, entertainment unit, navigation device, communications device, personal digital assistant (PDA), fixed location data unit, microprocessor and/or a computer.

16. A multi-stage diversity receiver switch, comprising:
means for switching communications with a transceiver; and
means for switching communications between a diversity receiver antenna and a transceiver switching means, the antenna switching means being configured to handle a different amount of power than the transceiver switching means, the difference in power handling capability based at least in part on an amount of power leaked from a primary antenna to the diversity receiver antenna.

17. The diversity receiver switch of claim 16, integrated into a mobile phone, a set top box, music player, video player, entertainment unit, navigation device, communications device, personal digital assistant (PDA), fixed location data unit, microprocessor and/or a computer.

18. A method of communication within a diversity receiver switch, comprising:
decoupling, through at least one first stage switch, a diversity antenna signal from at least one second stage switch when the diversity receiver switch is in an off state; and
coupling, through the at least one first stage switch, the diversity antenna signal to the at least one second stage switch when the diversity receiver switch is in an on state, the at least one first stage switch being configured to handle a different amount of power than the at least one second stage switch, the difference in power handling capability based at least in part on an amount of power leaked from a primary antenna to a diversity receiver antenna.

19. The method of claim 18, further comprising integrating the diversity receiver switch into a mobile phone, a set top box, music player, video player, entertainment unit, navigation device, communications device, personal digital assistant (PDA), fixed location data unit, microprocessor and/or a computer.

20. A method of communication within a diversity receiver switch, comprising:
the step of decoupling, through at least one first stage switch, a diversity antenna signal from at least one second stage switch when the diversity receiver switch is in an off state; and
the step of coupling, through the at least one first stage switch, the diversity antenna signal to the at least one second stage switch when the diversity receiver switch is in an on state, the at least one first stage switch being configured to handle a different amount of power than the at least one second stage switch, the difference in power handling capability based at least in part on an amount of power leaked from a primary antenna to a diversity receiver antenna.

21. The method of claim 20, further comprising integrating the diversity receiver switch into a mobile phone, a set top box, music player, video player, entertainment unit, navigation device, communications device, personal digital assistant (PDA), fixed location data unit, microprocessor and/or a computer.

* * * * *